(12) United States Patent
Schönlein et al.

(10) Patent No.: US 12,590,033 B2
(45) Date of Patent: Mar. 31, 2026

(54) FINELY GROUND PORTLAND CEMENT CLINKER IN A CEMENTITIOUS MULTI-COMPONENT MORTAR SYSTEM FOR USE AS AN INORGANIC CHEMICAL FASTENING SYSTEM

(71) Applicant: Hilti Aktiengesellschaft, Schaan (LI)

(72) Inventors: Markus Schönlein, Gilching (DE);
Armin Pfeil, Landsberg am Lech (DE);
Bernhard Middendorf, Calden (DE);
Tim Schade, Kassel (DE)

(73) Assignee: Hilti Aktiengesellschaft, Schaan (LI)

( * ) Notice: Subject to any disclaimer, the term of this patent is extended or adjusted under 35 U.S.C. 154(b) by 660 days.

(21) Appl. No.: 17/997,002

(22) PCT Filed: May 6, 2021

(86) PCT No.: PCT/EP2021/062012
§ 371 (c)(1),
(2) Date: Oct. 24, 2022

(87) PCT Pub. No.: WO2021/228683
PCT Pub. Date: Nov. 18, 2021

(65) Prior Publication Data
US 2023/0167027 A1      Jun. 1, 2023

(30) Foreign Application Priority Data

May 15, 2020    (EP) ..................................... 20174877

(51) Int. Cl.
| | |
|---|---|
| *C04B 28/16* | (2006.01) |
| *C04B 14/06* | (2006.01) |
| *C04B 18/14* | (2006.01) |
| *C04B 24/26* | (2006.01) |
| *C04B 40/00* | (2006.01) |
| *C04B 40/06* | (2006.01) |
| C04B 103/30 | (2006.01) |
| C04B 111/00 | (2006.01) |

(52) U.S. Cl.
CPC .............. *C04B 28/16* (2013.01); *C04B 14/06* (2013.01); *C04B 18/146* (2013.01); *C04B 24/2647* (2013.01); *C04B 40/0042* (2013.01); *C04B 40/065* (2013.01); *C04B 2103/30* (2013.01); *C04B 2111/00715* (2013.01)

(58) Field of Classification Search
CPC ....... C04B 28/16; C04B 14/06; C04B 18/146; C04B 24/2647; C04B 40/0042; C04B 40/065; C04B 2103/30; C04B 2111/00715; C04B 7/527; C04B 28/04; C04B 14/10; C04B 14/22; C04B 14/26; C04B 14/28; C04B 14/303; C04B 14/305; C04B 18/08; C04B 18/141; C04B 22/142; C04B 40/0666; C04B 2103/54; Y02W 30/91
See application file for complete search history.

(56) References Cited

U.S. PATENT DOCUMENTS

| | | | | |
|---|---|---|---|---|
| 3,608,839 | A | * | 9/1971 | Fagerholt ................ B02C 17/06 |
| | | | | 241/153 |
| 3,628,973 | A | * | 12/1971 | Greening ................ C04B 7/326 |
| | | | | 106/734 |
| 4,098,613 | A | * | 7/1978 | Maravilla ............... C04B 28/02 |
| | | | | 106/722 |
| 4,501,830 | A | * | 2/1985 | Miller ..................... C04B 28/04 |
| | | | | 523/401 |
| 4,725,632 | A | * | 2/1988 | Vess ........................ C04B 28/04 |
| | | | | 523/218 |
| 9,505,659 | B2 | | 11/2016 | Bickbau |
| 11,214,526 | B2 | | 1/2022 | Pfeil et al. |
| 2010/0150666 | A1 | * | 6/2010 | Abe ........................ E02D 5/808 |
| | | | | 405/259.5 |
| 2010/0294170 | A1 | | 11/2010 | Clemens et al. |
| 2016/0159692 | A1 | | 6/2016 | Bickbau |
| 2018/0251404 | A1 | | 9/2018 | Pfeil et al. |
| 2018/0319567 | A1 | * | 11/2018 | Miller ................ B65D 81/3266 |
| 2021/0380481 | A1 | | 12/2021 | Pfeil et al. |

FOREIGN PATENT DOCUMENTS

| | | |
|---|---|---|
| CN | 107241905 | 10/2017 |
| CN | 108137425 | 6/2018 |
| DE | 102011006286 | 10/2012 |
| DE | 102016001761 | 8/2017 |
| EP | 3636619 | 4/2020 |
| WO | 2018/189295 | 10/2018 |

OTHER PUBLICATIONS

Feng Naiqian, "High Performance Concrete", China Building Industry Press, Aug. 1996, pp. 40-41 and 48, with English translation.
Hu Shuguang, "Special Cements", Wuhan University of Technology Press, Jan. 2010, pp. 198-199, with English translation.
Liu Qiumei et al., "Civil Engineering Materials", Higher Education Textbook for Civil Engineering, Textbook for Facing the 21st Century Curriculum, Southwest, Jiatong University Press, Jan. 2019, pp. 40-41, with English translation.
International Search Report dated Jul. 20, 2021, in PCT/EP2021/062012, with English translation, 6 pages.
Written Opinion dated Jul. 20, 2021, in PCT/EP2021/062012, with English translation, 9 pages.

* cited by examiner

*Primary Examiner* — Doris L Lee

(74) *Attorney, Agent, or Firm* — Grüneberg Global IP, PLLC

(57) ABSTRACT

A cementitious multi-component mortar system contains finely ground Portland cement clinker with a grinding fineness in the range of from 6,000 to 12,000 cm²/g. The cementitious multi-component mortar system can be used as an inorganic chemical fastening system for anchoring elements in mineral substrates.

12 Claims, No Drawings

FINELY GROUND PORTLAND CEMENT CLINKER IN A CEMENTITIOUS MULTI-COMPONENT MORTAR SYSTEM FOR USE AS AN INORGANIC CHEMICAL FASTENING SYSTEM

CROSS-REFERENCE TO RELATED APPLICATIONS

This application is the National Stage entry under § 371 of International Application No. PCT/EP2021/062012, filed on May 6, 2021, and which claims the benefit of priority to European Application No. 20174877.9, filed on May 15, 2020. The content of each of these applications is hereby incorporated by reference in its entirety.

BACKGROUND OF THE INVENTION

Field of the Invention

The invention is in the field of the chemical fastening of anchoring elements in mineral substrates in the field of construction and fastening technology, and in particular relates to the chemical fastening of anchoring elements by means of an inorganic chemical fastening system based on finely ground Portland cement clinker in a cementitious multi-component mortar system.

Description of Related Art

Composite mortars for fastening anchoring elements in mineral substrates in the field of construction and fastening technology are known. These composite mortars are based almost exclusively on organic epoxy-containing resin/hardener systems. However, it is well known that such systems are polluting, expensive, potentially hazardous and/or toxic to the environment and the person handling them and they often need to be specially labeled. In addition, organic systems often exhibit greatly reduced stability when exposed to strong sunlight or otherwise elevated temperatures, which reduces their mechanical performance in the chemical fastening of anchoring elements.

There is therefore a need for a ready-to-use cementitious multi-component mortar system, preferably a cementitious two-component mortar system, which is superior to the prior art systems in terms of environmental aspects, health and safety, handling, storage time and a good balance between setting and curing. Furthermore, it is of interest to provide a system which can be used for the chemical fastening of anchoring elements in mineral substrates without adversely affecting the handling, properties and mechanical performance of the chemical fastening system. In particular, a cementitious multi-component mortar system characterized by excellent load values is desirable.

SUMMARY OF THE INVENTION

In view of the above, it is an object of the present invention to provide a cementitious system, in particular a cementitious multi-component mortar system, in particular a cementitious two-component mortar system, which overcomes the disadvantages of the prior art systems. In particular, it is an object to provide a ready-to-use cementitious multi-component mortar system which is easy to handle and environmentally friendly, which can be stored stably for a certain period of time prior to use and which has a good balance between setting and curing, and also exhibits excellent mechanical performance under the influence of elevated temperatures in the chemical fastening of anchoring elements in mineral substrates.

Furthermore, it is an object of the present invention to provide a cementitious multi-component mortar system which can be used for the chemical fastening of anchoring means, preferably metal elements, in mineral substrates, such as structures made of brick, natural stone, concrete, permeable concrete or the like.

This and further objects, which will become apparent from the following description of the invention, are achieved by the present invention, as described below. Preferred embodiments are described further below.

The present invention relates to a cementitious multi-component mortar system comprising finely ground Portland cement clinker with a grinding fineness in the range of from 6000 to 12000 cm²/g, which is ideally suited for use as an inorganic chemical fastening system for anchoring elements in mineral substrates in order to achieve high load values. In particular, the present invention relates to a cementitious multi-component mortar system comprising finely ground Portland cement clinker with a grinding fineness in the range of from 6000 to 12000 cm²/g, a sulfate carrier and optionally silica fume, which is ideally suited for use as an inorganic chemical fastening system for anchoring elements in mineral substrates in order to achieve high load values.

The present invention also relates to the use of such a cementitious multi-component mortar system for the chemical fastening of anchoring means, preferably metal elements, in mineral substrates, such as structures made of brick, natural stone, concrete, permeable concrete or the like.

The present invention further relates to the use of finely ground Portland cement clinker with a grinding fineness in the range of from 6000 to 12000 cm²/g in a cementitious mortar system as an inorganic chemical fastening system for anchoring elements in mineral substrates to increase the load values.

Some other objects and features of this invention are obvious and some will be explained hereinafter. In particular, the subject matter of the present invention will be described in detail on the basis of the embodiments.

DETAILED DESCRIPTION OF THE INVENTION

The following terms are used within the scope of the present invention:

In the context of the present invention, the term "binder" or "binder component" relates to the cementitious component, and optional components such as fillers, of the multi-component mortar system. In particular, this is also referred to as the A component.

In the context of the present invention, the term "initiator" or "initiator component" relates to the aqueous hydrating component, preferably added water, which triggers stiffening, solidification and hardening as a subsequent reaction. In particular, this is also referred to as the B component.

The terms "comprise," "with" and "have" are intended to be inclusive and mean that elements other than those cited may also be meant.

As used within the scope of the present invention, the singular forms "a" and "an" also include the corresponding plural forms, unless something different can be inferred unambiguously from the context. Thus, for example, the term "a" is intended to mean "one or more" or "at least one," unless otherwise indicated.

Various types of cement, their composition and their areas of application are known from the prior art, but their use as an inorganic chemical fastening system, in particular, the use of a cementitious multi-component mortar system based on finely ground Portland cement clinker, is still largely unknown.

It has now been found that a cementitious multi-component mortar system comprising finely ground Portland cement clinker with a grinding fineness in the range of from 6000 to 12000 cm$^2$/g is ideally suited for use as an inorganic chemical fastening system for anchoring elements in mineral substrates in order to achieve high load values, in particular a cementitious multi-component mortar system comprising finely ground Portland cement clinker with a grinding fineness in the range of from 6000 to 12000 cm$^2$/g, a sulfate carrier and optionally silica fume.

Furthermore, such a system, in particular the cementitious multi-component mortar system, is characterized by positive advantages in terms of environmental aspects, health and safety, handling, storage time and a good balance between setting and curing, without adversely affecting the handling, properties and mechanical performance of the chemical fastening system.

Therefore, the present invention relates to a cementitious multi-component mortar system comprising finely ground Portland cement clinker with a grinding fineness in the range of from 6000 to 12000 cm$^2$/g, for use as an inorganic chemical fastening system for anchoring elements in mineral substrates. In particular, the present invention relates to a cementitious multi-component mortar system comprising finely ground Portland cement clinker with a grinding fineness in the range of from 6000 to 12000 cm$^2$/g, a sulfate carrier and optionally silica fume, for use as an inorganic chemical fastening system for anchoring elements in mineral substrates.

The cementitious multi-component mortar system preferably comprises a binder component and an initiator component. It is preferred that the finely ground Portland cement clinker be present in the binder component. It is particularly preferred that the cementitious multi-component mortar system is a two-component mortar system and comprises a powdered cementitious binder component and an aqueous initiator component.

The Portland cement clinker of the cementitious multi-component mortar system comprises from 58 to 70% calcium oxide (CaO), from 18 to 26% silicon dioxide (SiO$_2$), from 1 to 10% aluminum oxide (Al$_2$O$_3$) and from 1 to 10% iron oxide (Fe$_2$O$_3$). Other characteristics of the Portland cement clinker are titanium dioxide (TiO$_2$), sodium oxide (Na$_2$O), potassium oxide (K$_2$O), chloride, sulfide, phosphorus pentoxide (P$_2$O$_5$), sulfur trioxide (SO$_3$) and magnesium oxide (MgO), which preferably make up less than 5% of the clinker.

The clinker phases of the Portland cement clinker of the cementitious multi-component mortar system comprise from 40 to 80% tricalcium silicate (alite) C$_3$S, from 5 to 30% dicalcium silicate (belite) C$_2$S, from 1 to 20% tricalcium aluminate C$_3$A, from 1 to 20% calcium aluminate ferrite C$_4$AF and other phases that are present in smaller quantities in the clinker.

The cementitious multi-component mortar system of the present invention comprises finely ground Portland cement clinker with a grinding fineness in the range of from 6000 to 12000 cm$^2$/g, preferably in a range of from 7000 to 12000 cm$^2$/g, most preferably in a range of from 9000 to 12000 cm$^2$/g. In a particularly preferred embodiment of the cementitious multi-component mortar system, the finely ground Portland cement clinker has a grinding fineness in the range of from 9000 to 12000 cm$^2$/g.

The cementitious multi-component mortar system of the present invention preferably comprises the finely ground Portland cement clinker in a range of from 1 wt. % to 50 wt. %, more preferably from 10 wt,% to 40 wt. %, most preferably in a range of from 20 wt. % to 30 wt. %, based on the total weight of the binder.

The cementitious multi-component mortar system preferably further comprises a sulfate carrier and optionally silica fume. Preferably, the sulfate carrier and the optional silica fume are present in the binder component. Particularly preferably, the finely ground Portland cement clinker, the sulfate carrier and the optional silica fume are present in the binder component.

The sulfate carrier of the cementitious multi-component mortar system comprises a sulfate carrier selected from the group consisting of calcium sulfate, sodium sulfate, lithium sulfate, magnesium sulfate and potassium sulfate. The cementitious multi-component mortar system preferably comprises calcium sulfate selected from calcium sulfate dihydrate, calcium sulfate anhydrite, calcium sulfate hemihydrate and mixtures thereof. In a particularly preferred embodiment of the cementitious multi-component mortar system, the sulfate carrier is a mixture of anhydrite and hemihydrate, preferably with a wt. % ratio of 1.5:1. The sulfate carrier significantly influences the solidification behavior of the cement mixed with water. The cementitious multi-component mortar system of the present invention preferably comprises the sulfate carrier in a range of from 1 wt. % to 6 wt. %, more preferably from 1.5 wt. % to 5 wt. %, most preferably in a range of from 2 wt. % to 4 wt. %, based on the total weight of the binder component.

It has advantageously been found that high load values can be achieved if the sulfate carrier is present in the cementitious multi-component mortar system with a grinding fineness in the range of from 6000 to 12000 cm$^2$/g, preferably in a range of from 7000 to 10000 cm$^2$/g, most preferably in a range of from 8000 to 9500 cm$^2$/g.

The silica fume of the cementitious multi-component mortar system is present in a range of from 1 wt. % to 10 wt. %, preferably from 2 wt. % to 8 wt. %, most preferably in a range of from 4 wt. % to 6 wt. %, based on the total weight of the binder. The silica fume preferably has an average particle size of 0.4 μm and a surface area of from 180,000 to 220,000 cm$^2$/g or 18-22 m$^2$/g.

Alternatively, the silica fume can also be replaced by pozzolanic materials or by materials with pozzolanic properties or by other fine reactive or inert fillers. These are, for example, corundum, calcite, dolomite, brick dust, rice husk ash, phonolite, calcined clay, fly ash, granulated blast-furnace slag, kaolin and metakaolin.

In a preferred embodiment of the cementitious multi-component mortar system, the silica fume is present in a range of from 5 wt. % to 6 wt. %, based on the total weight of the binder.

Furthermore, at least one filler or filler mixtures can be present in the binder component. These are preferably selected from the group consisting of quartz, sand, quartz powder, clay, fly ash, granulated blast-furnace slag, pigments, titanium oxides, light fillers, limestone fillers, corundum, dolomite, alkali-resistant glass, crushed stones, gravel, pebbles and mixtures thereof.

The at least one filler of the cementitious multi-component mortar system is preferably present in a range of from 20 wt. % to 70 wt. %, more preferably from 30 wt. % to 60 wt. %, most preferably in a range from 40 wt. % to 50 wt. %, based on the total weight of the binder.

In a preferred embodiment of the cementitious multi-component mortar system, the filler is sand and is present in a range of from 50 to 55 wt. %, based on the total weight of the binder.

In a particularly preferred embodiment of the present invention, the filler is a mixture of sand and quartz powder. The sand is preferably present in a range of from 50 wt. % to 55 wt. % and the quartz powder in a range of from 10 wt. % to 11 wt. %, based on the total weight of the binder.

Furthermore, the binder component can contain at least one accelerator or accelerator mixtures in powder form. Common accelerators for Portland cement can be used. The accelerator consists of at least one alkali and/or alkaline earth metal salt selected from the group consisting of hydroxides, chlorides, sulfates, phosphates, monohydrogen phosphates, dihydrogen phosphates, nitrates, carbonates and mixtures thereof, the at least one accelerator is preferably an alkali and/or alkaline earth metal salt, a calcium metal salt such as calcium hydroxide, calcium sulfate, calcium carbonate, calcium chloride, calcium nitrate, calcium formate or calcium phosphate, a sodium metal salt such as sodium hydroxide, sodium sulfate, sodium carbonate, sodium chloride, sodium nitrate, sodium formate or sodium phosphate, or of C-S-H germs.

Furthermore, the binder component can contain other cements, such as calcium aluminate-based cement. Furthermore, the binder component can contain fibers such as mineral fibers, chemical fibers, natural fibers, synthetic fibers, fibers made of natural or synthetic polymers, or fibers made of inorganic materials, in particular carbon fibers or glass fibers.

The initiator component of the multi-component mortar system comprises water and optionally a plasticizer. The water content is in a range of more than 70 wt. %, preferably more than 80 wt. %, most preferably more than 90 wt. %, based on the total weight of the initiator component. In a preferred embodiment, the water content is present in a range of from 70 wt. % to 100 wt. %, more preferably from 80 wt. % to 95 wt. %, most preferably in a range of from 90 wt. % to 95 wt. %, based on the total weight of the initiator component.

The optional plasticizer is present in a range of from 1 wt. % to 30 wt. %, preferably from 5 wt. % to 25 wt. %, most preferably in a range from 10 wt. % to 20 wt. %, based on the total weight of the initiator component. The optional plasticizer is selected from the group consisting of poly-acrylic acid polymers with low molecular weight (LMW), superplasticizers from the family of polyphosphonate polyox and polycarbonate polyox, polycondensates, for example naphthalene sulfonic acid formaldehyde polycondensate or melamine sulfonic acid formaldehyde polycondensate, lignosulfonates and ethacrylic superplasticizers from the polycarboxylate ether group, and mixtures thereof, for example Ethacryl® G (Contex, Arkema Group; France), Acumer® 1051 (Rohm and Haas; UK) or Sika® Viso-Crete™-20 HE (Sika, Germany). Suitable plasticizers are commercially available products.

In a very special embodiment of the cementitious multi-component mortar system, the water content is 90 wt. % to 95 wt. % and the plasticizer content is 5 wt. % to 10 wt. %, based on the total weight of the initiator component.

Furthermore, at least one filler or filler mixtures can be present in the initiator component. These are preferably selected from the group consisting of quartz, sand, quartz powder, clay, fly ash, granulated blast-furnace slag, pigments, titanium oxides, light fillers, limestone fillers, corundum, dolomite, alkali-resistant glass, crushed stones, gravel, pebbles and mixtures thereof.

Furthermore, the initiator component can contain at least one accelerator or accelerator mixtures in aqueous form. Common accelerators for Portland cement can be used. The accelerator consists of at least one alkali and/or alkaline earth metal salt selected from the group consisting of hydroxides, chlorides, sulfates, phosphates, monohydrogen phosphates, dihydrogen phosphates, nitrates, carbonates and mixtures thereof, the at least one accelerator is preferably an alkali and/or alkaline earth metal salt, a calcium metal salt such as calcium hydroxide, calcium sulfate, calcium carbonate, calcium chloride, calcium nitrate, calcium formate or calcium phosphate, a sodium metal salt such as sodium hydroxide, sodium sulfate, sodium carbonate, sodium chloride, sodium nitrate, sodium formate or sodium phosphate, or consists of Master X-Seed 100 (BASF).

The initiator component can additionally comprise a thickener. The thickener can be selected from the group consisting of bentonite, silica, acrylate-based thickeners, such as alkali-soluble or alkali-swellable emulsions, quartz dust, clay and titanate chelating agents. Examples given are polyvinyl alcohol (PVA), hydrophobically modified alkali-soluble emulsions (HASE), hydrophobically modified ethylene oxide urethane polymers, which are known in the art as HEUR, and cellulose thickeners such as hydroxymethyl cellulose (HMC), hydroxyethyl cellulose (HEC), hydrophobically modified hydroxyethyl cellulose (HMHEC), sodium carboxymethyl cellulose (SCMC), sodium carboxymethyl-2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydroxypropyl cellulose, attapulgite clay, and mixtures thereof. Suitable thickeners are commercially available products such as Optigel WX (BYK-Chemie GmbH, Germany), Rhealate 1 (Elementis GmbH, Germany) and Acrysol ASE-60 (The Dow Chemical Company).

The presence of the above-mentioned components does not change the overall inorganic nature of the cementitious multi-component mortar system.

The A component or binder component, which comprises the finely ground Portland cement clinker with a grinding fineness in the range of from 6000 to 12000 $cm^2/g$, the sulfate carrier and the silica fume, is in solid form, preferably in the form of a powder or dust. The B component or initiator component is in aqueous form, possibly in the form of a slurry or paste.

The weight ratio between the A component and the B component (A/B) is preferably between 10/1 and 1/3, and is preferably 8/1-4/1. The cementitious multi-component mortar system preferably comprises the A component in an amount of up to 80 wt. % and the B component in an amount of up to 40 wt. %.

After being prepared separately, the A component and the B component are placed in separate containers from which they can be mixed by mechanical action. In particular, the cementitious multi-component mortar system is a two-component mortar system, preferably a cementitious two-component capsule system. The system preferably comprises two or more film pouches for separating the curable binder component and the initiator component. The contents of the chambers, glass capsules or pouches, such as film pouches, which are mixed with one another under mechanical action, preferably by introducing an anchoring element, are preferably already present in a borehole. The arrangement in multi-chamber cartridges or tubs or sets of buckets is also possible.

The cementitious multi-component mortar system of the present invention can be used for the chemical fastening of anchoring elements, preferably metal elements, such as anchor rods, in particular threaded rods, bolts, steel reinforcing rods or the like, in mineral surfaces such as structures made of brick, concrete, permeable concrete or natural stone. In particular, the cementitious multi-component mortar system of the present invention can be used for the chemical fastening of anchoring elements, such as metal elements, in boreholes. It can be used for anchoring purposes involving an increase in load capacity and/or an increase in bond strength in the cured state.

In addition, the cementitious multi-component mortar system of the present invention can be used for the application of fibers, scrims, knitted fabrics or composites, in particular fibers with a high modulus, preferably carbon fibers, in particular for reinforcing building structures, for example walls or ceilings or floors, and also for mounting components, such as panels or blocks, e.g. made of stone, glass or plastic, on buildings or structural elements.

In particular, finely ground Portland cement clinker with a grinding fineness in the range of from 6000 to 12000 $cm^2/g$ is used in a cementitious multi-component mortar system in order to increase the load values. Preferably, finely ground Portland cement clinker with a grinding fineness in the range of 6000 to 12000 $cm^2/g$, a sulfate carrier and optionally silica fume is used in a cementitious two-component mortar system in order to increase the load values.

The following examples illustrate the invention without thereby limiting it.

EXAMPLES

1. Composition of the Clinker

TABLE 1

Chemical composition, characteristics and phase composition of the clinker powder, determined by means of X-ray fluorescence analysis (XRF) and X-ray diffraction analysis (XRD) with Rietveld refinement.

| | Clinker name | K5000 | K7000 | K9000 | K12000 |
|---|---|---|---|---|---|
| Oxides [m. %] (XRF) | $SiO_2$ | 21.35 | 20.88 | 20.71 | 19.77 |
| | $Al_2O_3$ | 5.71 | 5.59 | 5.89 | 5.73 |
| | $Fe_2O_3$ | 2.15 | 2.13 | 2.29 | 2.37 |
| | CaO | 66.20 | 65.74 | 65.36 | 63.85 |
| | MgO | 0.94 | 0.92 | 0.95 | 0.97 |
| | $SO_3$ | 0.80 | 0.80 | 1.18 | 1.43 |
| | $Na_2O$ | 0.36 | 0.34 | 0.42 | 0.45 |
| | $K_2O$ | 0.67 | 0.66 | 0.95 | 1.16 |
| | Cl | 0.01 | 0.01 | 0.01 | 0.02 |
| | $P_2O_5$ | 0.14 | 0.14 | 0.13 | 0.13 |
| | Sulfide | 0.11 | 0.10 | 0.07 | 0.14 |
| Phases [%] (XRD) | $C_3S$ | 63.70 | 63.76 | 62.43 | 61.36 |
| | $C_2S$ | 16.39 | 16.55 | 16.38 | 16.29 |
| | $C_3A$ | 11.53 | 11.65 | 12.13 | 12.67 |
| | $C_4AF$ | 5.26 | 4.87 | 5.75 | 5.75 |
| | Other | 2.86 | 3.08 | 3.17 | 3.78 |
| Grinding fineness of the clinker in $cm^2/g$ (Blaine) | | 5,000 | 7,000 | 9,000 | 12,000 |
| Specific surface area in $cm^2/g$ (Blaine) | | 4,745 | 6,810 | 8,900 | 11,780 |
| Density in $g/cm^3$ | | 3.167 | 3.171 | 3.155 | 3.133 |
| Size distribution (μm) | | 0.1-80 | 0.1-50 | 0.1-30 | 0.1-30 |

2. Preparation of A Component and B Component

The powdered binder component (A component) and the liquid initiator component (B component) in comparative examples 1, 8, 10, 12 and 14 and examples 2-7, 9, 11, 13 and 15 according to the invention are prepared initially by mixing the components specified in tables 2 and 3 in the proportions specified in table 4, which are expressed in wt. %.

TABLE 2

Composition of A component based on finely ground Portland cement clinker (wt. %).

| | Binder K5000 | Binder K7000 | Binder K9000 | Binder K12000 | Solidification regulator Calcium sulfate[1] | Binder Silica fume[2] | Filler Sand[3] | Filler Quartz powder[4] |
|---|---|---|---|---|---|---|---|---|
| A0 | 30.8 | | | | 1.1 | 6.5 | 51.1 | 10.5 |
| A1 | | 29.4 | | | 1.4 | 6.2 | 52.2 | 10.8 |
| A2 | | | 26.6 | | 4 | 5.6 | 52.8 | 10.9 |

TABLE 2-continued

Composition of A component based on finely ground Portland cement clinker (wt. %).

| | Binder K5000 | Binder K7000 | Binder K9000 | Binder K12000 | Solidification regulator Calcium sulfate[1] | Binder Silica fume[2] | Filler Sand[3] | Filler Quartz powder[4] |
|---|---|---|---|---|---|---|---|---|
| A3 | | 28.0 | | | 1.7 | 6 | 53.3 | 11 |
| A4 | | | 24.8 | | 5.4 | 5.3 | 53.5 | 11.0 |
| A5 | | | 26.3 | | 2.9 | 5.6 | 54.1 | 11.1 |
| A6 | | | 27.9 | | 2 | 5.8 | 54.1 | 11.2 |

[1]Calcium sulfate: Mixture of calcium sulfate hemihydrate and calcium sulfate anhydrite in a wt. % ratio of 1:1.5; grinding fineness in cm²/g (Blaine) 9,000; size distribution (μm) 0.1-30.
[2]Silica fume: Grinding fineness in cm²/g (Blaine) 180,000-220,000; size distribution (μm) 0.1-10.
[3]Sand: Size distribution (μm) 125-1000.
[4]Quartz powder: Size distribution (μm) 0.1-100.

TABLE 3

Composition of B component (wt. %).

| | Initiator Water | Plasticizer Polycarboxylate ethers |
|---|---|---|
| B0 | 91.2 | 8.8 |
| B1 | 95.1 | 4.9 |

TABLE 4

Mixing ratio of A component to B component.

| A component | B component | A/B ratio | Water/binder ratio |
|---|---|---|---|
| A0 | B0 | 0.158 | 0.4 |
| A1 | B0 | 0.17 | 0.45 |
| A2 | B0 | 0.184 | 0.5 |
| A3 | B0 | 0.184 | 0.5 |
| A4 | B0 | 0.2 | 0.55 |
| A5 | B0 | 0.2 | 0.55 |
| A6 | B0 | 0.2 | 0.55 |
| A5 | B1 | 0.2 | 0.55 |
| A6 | B1 | 0.2 | 0.55 |

3. Determination of Mechanical Performance

After being, prepared separately, the powdered binder component A and the initiator component B are mixed using a mixer. All samples are mixed for 1 minute. The mixtures are poured into a stainless-steel sleeve borehole having a diameter of 12 mm, anchorage depth of 32 mm and ground undercuts of 0.33 mm. Immediately after filling, an M8 threaded rod with a length of 100 mm is inserted into the borehole.

The load values of the cured mortar compositions are determined at specific times within 24 hours using a "Zwick Roell Z050" material testing device (Zwick GmbH & Co. KG, Ulm, Germany). The stainless-steel sleeve is fastened to a panel, while the threaded rod is fastened to the force measuring device with a nut, With a preload of 500 N and a test speed of 3 mm/min, the fracture load is determined by pulling out the threaded rod centrally. Each sample consists of an average of five extracts. The fracture load is calculated as the internal strength and given in table 5 in N/mm².

TABLE 5

Internal strength in N/mm².

| Example | Components | Temperature | Setting time in min | Internal strength in N/mm² |
|---|---|---|---|---|
| 1 | A0 + B0 | 20° C. | 5 | 5.4 |
| 2 | A1 + B0 | 20° C. | 3 | 8.5 |
| 3 | A2 + B0 | 20° C. | 3 | 13.8 |
| 4 | A3 + B0 | 20° C. | 1 | 14.0 |
| 5 | A4 + B0 | 20° C. | 2 | 19.2 |
| 6 | A5 + B0 | 20° C. | 1 | 20.5 |
| 7 | A6 + B0 | 20° C. | 1 | 20.7 |
| 8 | A0 + B0 | 0° C. | 6 | 0.3 |
| 9 | A6 + B0 | 0° C. | 1 | 4.9 |
| 10 | A0 + B0 | 5° C. | 6 | 0.9 |
| 11 | A6 + B0 | 5° C. | 1 | 4.5 |
| 12 | A0 + B0 | 10° C. | 5 | 3.8 |
| 13 | A6 + B0 | 10° C. | 1 | 11.9 |
| 14 | A0 + B1 | 20° C. | 7 | 2.8 |
| 15 | A6 + B1 | 20° C. | 2 | 19.3 |

As can be seen from Table 5, after curing for 24 hours all measurable systems according to the invention show considerable internal strengths and increased load values and thus improved mechanical strengths compared to the comparison system without increased fineness.

As shown above, the use of finely ground binders of the present invention, in particular with a fineness in the range of from 6000 to 12000 cm²/g, preferably a particle fineness of 10000 to 12000 cm²/g, provides an increase in the load values and thus mechanical strength even at low temperatures compared to systems with a low particle fineness of 3000 cm²/g.

The invention claimed is:

1. A cementitious multi-component mortar system for inorganic chemical fastening of anchoring elements in mineral substrates, comprising:

finely ground Portland cement clinker with a grinding fineness in a range of from 6,000 to 12,000 cm²/g, a sulfate carrier selected from the group consisting of calcium sulfate, sodium sulfate, lithium sulfate, magnesium sulfate, and potassium sulfate, wherein the sulfate carrier is a mixture of anhydrite and hemihydrate, silica fume, wherein the cementitious multi-component mortar system is a two-component capsule mortar system, and a mortar prepared from said cementitious multi-component mortar system has an internal strength of 4.5-20.7 N/mm².

2. The cementitious multi-component mortar system according to claim 1, further comprising at least one mineral filler selected from the group consisting of quartz, sand, quartz powder, clay, fly ash, granulated blast-furnace slag, a pigment, a titanium oxide, a light filler, a limestone filler, corundum, dolomite, alkali-resistant glass, crushed stone, gravel, pebbles, and a mixture thereof.

3. The cementitious multi-component mortar system according to claim 1, wherein the sulfate carrier is present with a grinding fineness in the range of from 6,000 to 12,000 $cm^2/g$.

4. The cementitious multi-component mortar system according to claim 1, wherein the sulfate carrier is calcium sulfate dihydrate, calcium sulfate anhydrite, calcium sulfate hemihydrate, or a mixture thereof.

5. The cementitious multi-component mortar system according to claim 1, wherein the finely ground Portland cement clinker is present in a range of from 1 wt. % to 50 wt. %, based on a total weight of a binder component of the cementitious multi-component mortar system.

6. The cementitious multi-component mortar system according to claim 1, wherein the sulfate carrier is present in a range of from 1 wt. % to 6 wt. %, based on a total weight of a binder component of the cementitious multi-component mortar system.

7. The cementitious multi-component mortar system according to claim 1, wherein the silica fume is present in a range of from 1 wt. % to 10 wt. %, based on a total weight of a binder component of the cementitious multi-component mortar system.

8. The cementitious multi-component mortar system according to claim 1, wherein the sulfate carrier is the mixture of anhydrite and hemihydrate with a wt. % ratio of 1.5:1.

9. The cementitious multi-component mortar system according to claim 1, wherein the two-component mortar system comprises:

a powdered A component, comprising the finely ground Portland cement clinker with a grinding fineness in the range of from 6,000 to 12,000 $cm^2/g$, a sulfate carrier, and silica fume, and an aqueous B component.

10. The cementitious multi-component mortar system according to claim 9, wherein the aqueous B component comprises water and a plasticizer.

11. A method of increasing load values of an inorganic chemical fastening system for anchoring elements in mineral substrates, the method comprising:

mixing finely ground Portland cement clinker with a grinding fineness in a range of from 6,000 to 12,000 $cm^2/g$ into a cementitious multi-component mortar system;

wherein the cementitious multi-component mortar system further comprises:

a sulfate carrier selected from the group consisting of calcium sulfate, sodium sulfate, lithium sulfate, magnesium sulfate, and potassium sulfate, the sulfate carrier is a mixture of anhydrite and hemihydrate;

and silica fume; and a mortar prepared from said cementitious multi-component mortar system has an internal strength of 4.5-20.7 $N/mm^2$.

12. The method according to claim 11, wherein the cementitious multi-component mortar system is a two-component mortar system, wherein the two-component mortar system comprises:

a powdered A component, comprising the finely ground Portland cement clinker with a grinding fineness in the range of from 6,000 to 12,000 $cm^2/g$, the sulfate carrier, and the silica fume, and an aqueous B component.

* * * * *